United States Patent
André

(10) Patent No.: US 7,830,922 B2
(45) Date of Patent: Nov. 9, 2010

(54) GENERATION OF CLOCK SIGNAL FROM RECEIVED PACKET STREAM

(75) Inventor: Tore Mikael André, Älvsjö (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 145 days.

(21) Appl. No.: 12/093,372

(22) PCT Filed: Nov. 14, 2005

(86) PCT No.: PCT/SE2005/001719

§ 371 (c)(1),
(2), (4) Date: Aug. 21, 2008

(87) PCT Pub. No.: WO2007/055627

PCT Pub. Date: May 18, 2007

(65) Prior Publication Data

US 2009/0225787 A1  Sep. 10, 2009

(51) Int. Cl.
*H04J 3/06* (2006.01)
(52) U.S. Cl. ...................... 370/503; 370/252
(58) Field of Classification Search .......... 370/503, 370/252, 498, 412, 352
See application file for complete search history.

(56) References Cited

U.S. PATENT DOCUMENTS

| 6,259,677 | B1 | 7/2001 | Jain |
| 6,661,810 | B1* | 12/2003 | Skelly et al. ............... 370/516 |
| 2002/0141452 | A1 | 10/2002 | Mauritz et al. |
| 2004/0258099 | A1* | 12/2004 | Scott et al. ............... 370/503 |
| 2005/0041692 | A1* | 2/2005 | Kallstenius .............. 370/503 |
| 2006/0013263 | A1* | 1/2006 | Fellman ................... 370/503 |

FOREIGN PATENT DOCUMENTS

EP  1 455 473 A2  9/2004

* cited by examiner

*Primary Examiner*—Ricky Ngo
*Assistant Examiner*—David Oveissi

(57) ABSTRACT

A receiving unit receiving packets of a packet stream having an evaluating unit for comparing the arrival times of the packets to a generated clock signal. The generated clock signal is used in transmitting information carried in the packets from the receiving unit. From the delays, a signal producing unit determines a characteristic delay value, which is characteristic of or typical of the statistical distribution of the delays. This characteristic delay value may be an average of the smallest delays of the distribution of delays for the latest received packets, and is used for adjusting the frequency of the generated clock signal. The average may be calculated or derived from all of the smallest delays of the distribution obtained for a predetermined share of the latest received packets.

6 Claims, 8 Drawing Sheets

Fig. 6
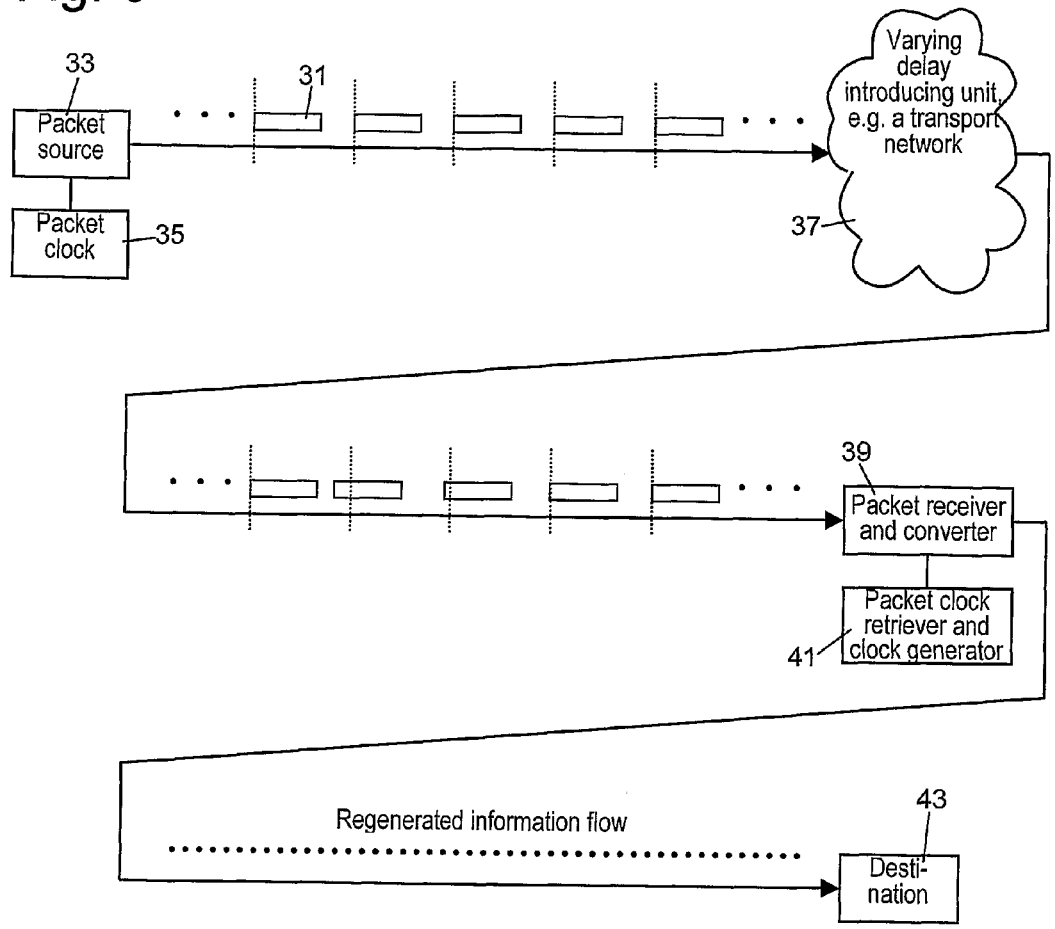
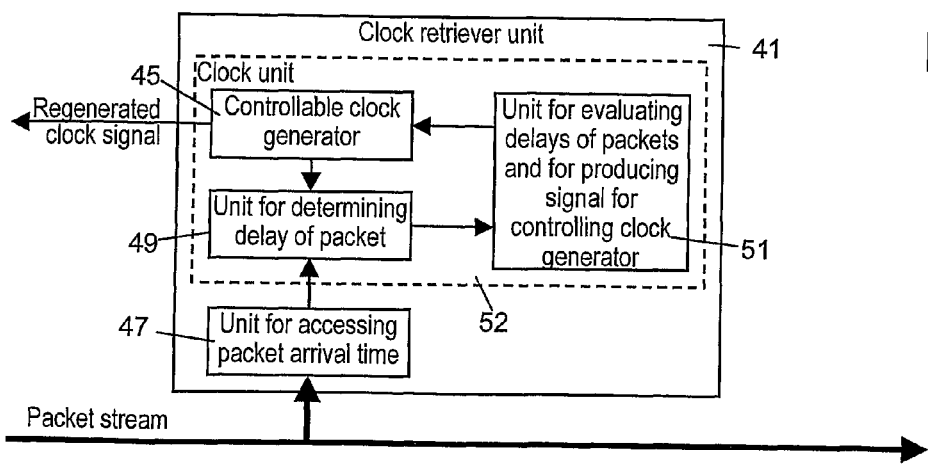
Fig. 7

GENERATION OF CLOCK SIGNAL FROM RECEIVED PACKET STREAM

FIELD OF THE INVENTION

The present invention relates to a receiving unit including devices for selecting packets to use for synchronization, to a method for generating a clock signal and to a method of issuing an information stream from a receiving unit.

BACKGROUND

In the pending International patent application No. PCT/SE2005/00686, "Synchronization of VoDSL for DSLAM Connected Only to Ethernet", filed May 11, 2005, inventor Tore André, a method and a device for synchronizing POTS (Plain Old Telephony Service) over packet networks are described, this previous patent application being incorporated by reference herein.

Generally, when packets are used for transporting information representing voice, a clock signal may be required, such as a sampling clock, when receiving the packets in order to be capable of forwarding the voice information in another medium. The clock signal should be related to the original clocking signal used in converting original voice information to a digital form and it may be used for converting the voice information carried in the packets to e.g. another digital form, such as a continuous bit stream, or to an analog signal. For example, in a mobile telephony network the base stations may receive voice information from a packet network, such as an Ethernet network, and then a packet clock signal may be regenerated in the base stations to be used to create clock signals for transmitting information from the base stations.

A telephone network including a packet transport network is schematically illustrated in FIG. 1 in which voice information is communicated through an Ethernet network. A telephone set 1 is through an Ethernet interface 3 connected through an Ethernet network symbolically illustrated by the Ethernet switch 5 to the PSTN (Public Switched Telephone Network) 7. The PSTN is connected to the Ethernet network at a local exchange/switch 9 and a TAG (Telephony Access Gateway) 11. The TAG places the voice samples in Ethernet frames and retrieves voice samples from received Ethernet frames.

The Ethernet interface 3 is connected to the Ethernet network at a network port 13. The interface includes a plurality of line circuits 15, each connected to an individual subscriber line 17. The Ethernet interface includes access equipment 19 that includes a module 21 for handling packets received from and transmitted into the Ethernet and a module 23 for handling calls, in particular for establishing and terminating calls and possibly for accounting.

Furthermore, the Ethernet interface 3 includes a clock device 25 taking information about incoming packets, such as from the network port 13, for generating a common clock signal distributed to the line circuits 15. Ethernet frames of a single stream arriving to the Ethernet interface can in an ideal case be supposed to arrive at equal distances in time. However, due to delay variation in the transport network random delays are added to the expected arrival times. Such random delays can be considered as a noise source in a timing recovery system, see FIG. 2. The noise is always positive but still a trend can be estimated, see the diagram of FIG. 3. The sloping line denoted by "Trend due to wrong clock" of FIG. 3 indicates in the case shown that the reference clock signal used has a little too high a frequency. The line should in the ideal case coincide with or be parallel to the abscissa axis of the diagram.

The clock device 25 can use, as described in the cited International patent application, an algorithm based on finding the smallest value within a time window of arrival times of received packets. This method is efficient if the distribution of delay values has a steep slope and a lot of packets arrive with delays close to a minimum delay, minx, see the diagram of FIG. 4.

In some cases, for e.g. a transport network having a high load, the majority of packets can be delayed more than the minimum delay, see the diagrams of FIGS. 5a and 5b. In those cases an algorithm using only the smallest values is not the best method since the packages arriving with very low delays are too rare.

SUMMARY

It is an object of the invention to provide a method and a receiving unit for producing a clock signal derived from arrival times of data packets.

Generally, delays of arrived packets are obtained by comparing the arrival times of the packets to a generated clock signal. The delays are evaluated to form a characteristic delay value that is characteristic of or typical of the statistical distribution of the delays. This characteristic delay value is used for adjusting the frequency of the generated clock signal. The characteristic delay value may e.g. be an average of the smallest delays of the distribution, such as for the latest received packets, or a value that may be said to represent, be indicative of or be substantially equivalent to such an average. In particular, the average or an equivalent quantity may be calculated or derived from all of the smallest delays of the distribution obtained for a predetermined share of the latest received packets, such as of packets received during a time period ranging up to the current instant and having a predetermined length, or of a predetermined number of latest arrived packets.

BRIEF DESCRIPTION OF THE DRAWINGS

The invention will now be described by way of non-limiting embodiments with reference to the accompanying drawings, in which:

FIG. 6 is a block diagram illustrating packets that are randomly delayed during transmission from a source to a receiver, FIG. 7 is a block diagram of a clock retriever unit in the receiver of FIG. 6.

DETAILED DESCRIPTION

Figure 1:
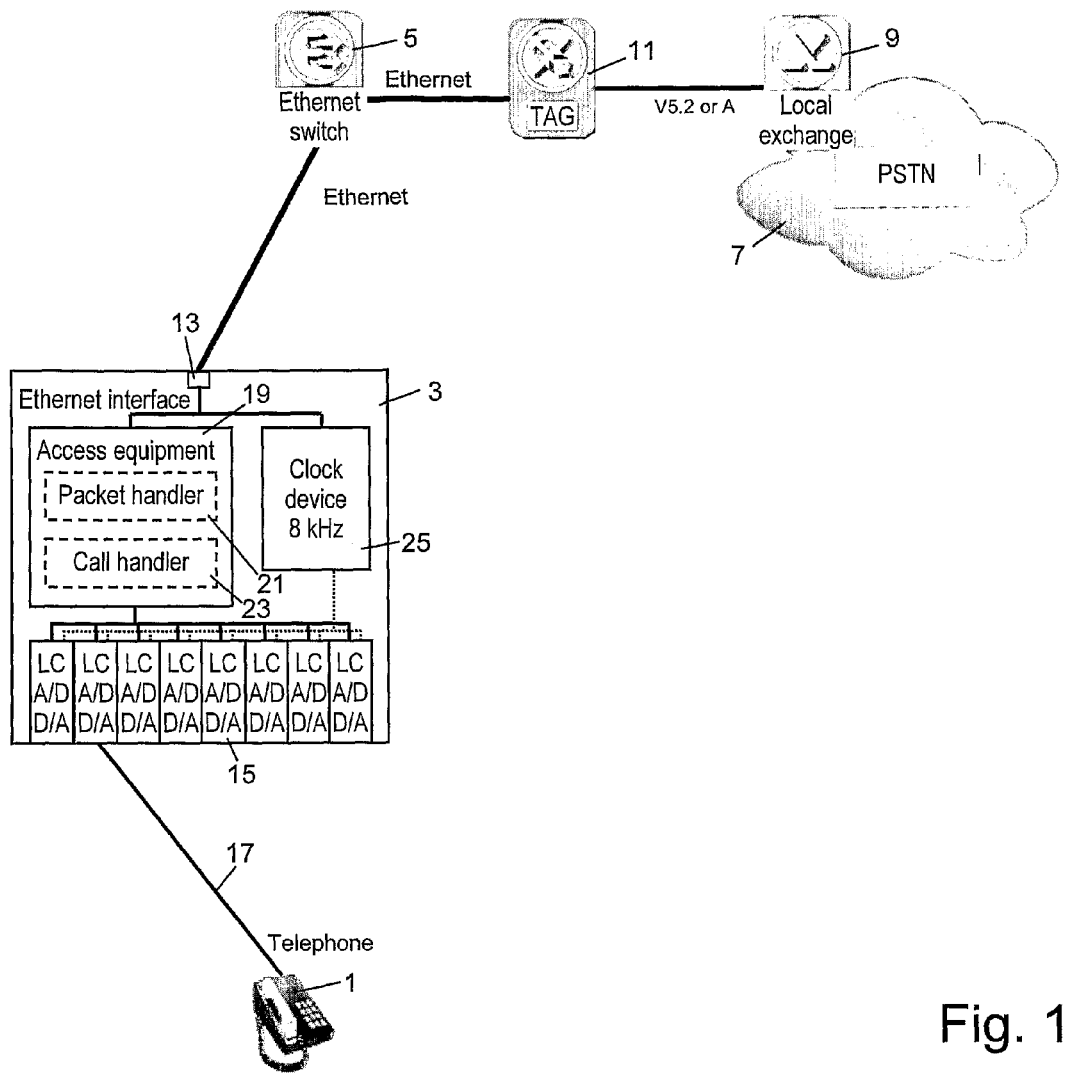
FIG. 1 is a schematic of communicating voice information from/to a telephone set where a packet network using e.g. Ethernet is used for transporting the voice information over some portion of the communication path to the public switched telephony network.
Figure 2:
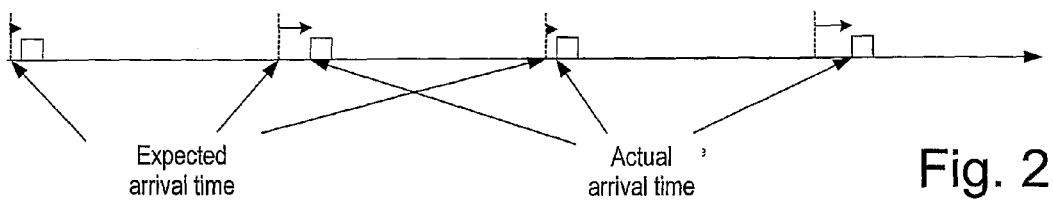
FIG. 2 is a diagram illustrating delays of packets received from a packet network.
Figure 3:
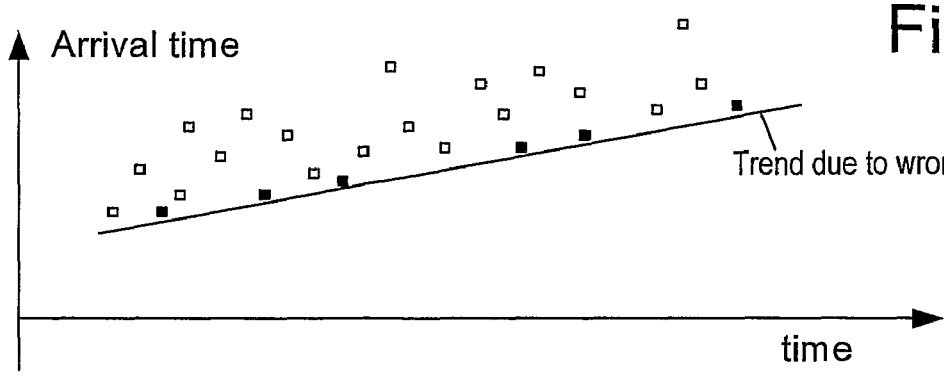
FIG. 3 is a diagram illustrating a trend of delays in relation to clock reference signal for delays of packets received from a packet network.
Figure 4:
FIG. 4 is a diagram illustrating a distribution of delays having a peak close to a minimum delay value.
Figure 5A:
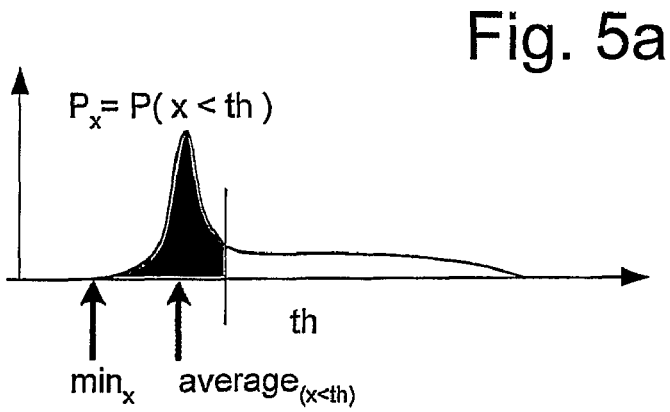
FIG. 5a is a diagram similar to FIG. 4 for a distribution of delays having a peak at a distance of a minimum delay value.
Figure 5B:
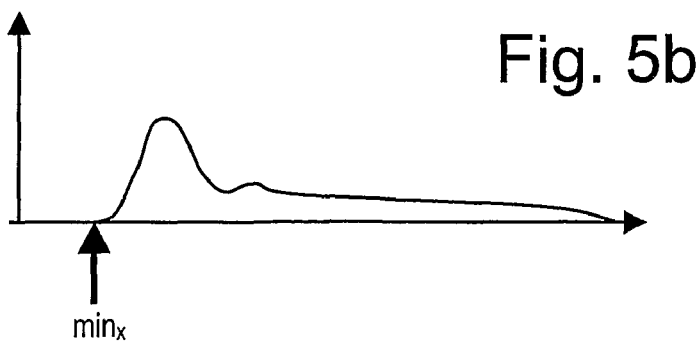
FIG. 5b is a diagram similar to FIG. 4 for a distribution of delays having two peaks.

In FIG. 6 is schematically illustrated how packets 31 are issued from a packet source 33 at periodically repeated times, as controlled by a packet clock unit 35 that e.g. provides a suitable clock signal. The packets are transported in some way, such as in wires or wirelessly, over a unit 37 introducing statistically varying delays, such as a transport network. The packets are from the delay introducing unit received by a packet receiver unit 39. A packet clock retrieving unit 41 associated with the receiver unit uses the received packets to generate a clock signal having a frequency that as good as possible agrees with the frequency with which the packets are issued from the packet source 33. The regenerated clock signal is used in the receiver unit 39 for issuing information based on the contents of the received packets to a destination 43, this information also transported in some suitable way, such as in wires or wirelessly. In one case, the packet source 33 receives voice information from e.g. a PSTN 7, see FIG. 1, converts it to digitally coded information and packetizes it, the clock used for the coding having a frequency of 8 kHz and the clock used for transmitting the produced packets being dependent on this 8 kHz clock. The packets transporting the voice information are received by the receiver unit 39 in which the 8 kHz frequency is restored (41) and used for converting, such as in the line circuits 15 of FIG. 1, in a digital-to-analog converter, the information of the packets to an analog signal transmitted to the destination 43. In another case, the regenerated clock signal may be used for restoring a packet stream issued with same frequency or period as the original packet stream to the destination unit 43 or a bit stream having a frequency related to the frequency with which the packets are issued from the packet source 33. The delays introduced in the transport of the packets can have distributions as illustrated in the graphs of FIGS. 4, 5a and 5b in which, on the ordinate direction, the number of packets is given for delays that are indicated on the abscissa axis. The delay distribution can for example typically be assumed to be varying rather slowly in time.

The clock retrieving unit 41, also called an adaptive clock generator, may have a structure e.g. as illustrated in the block diagram of FIG. 7. It includes a controllable or adjustable clock signal generator 45, an accessing unit 47 for accessing the arrival times of received packets and a determining unit 49. The determining unit determines the delay for each received packet from the arrival time of the packet in relation to the corresponding clock signal or clock pulse generated by the clock generator 45. An evaluation and signal producing unit 51 is connected to the determining unit 49 and produces, based on the determined delays, a signal for adjusting the clock generator 45, i.e. for adjusting the frequency thereof. The unit 49 for determining delays of packets, the unit 51 for evaluating delays of packets and for producing a signal for controlling the controllable clock signal generator and the controllable clock signal generator 45 are in this embodiment components of a general clock unit 52.

Figure 8A:
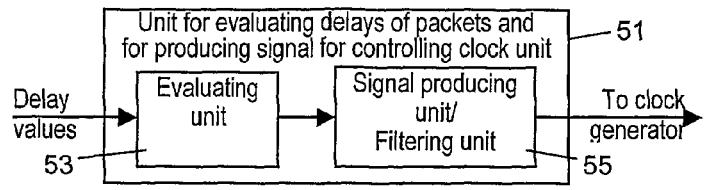
FIG. 8a is a block diagram of a special unit in the retriever unit of FIG. 7.

The evaluation and signal producing unit 51 can basically be built as illustrated in FIG. 8a. Thus, it can include an evaluation unit 53 that evaluates the delays of received packets and produces a characteristic delay value that is derived from the delays and in some way is typical of or characteristic of the delays. The characteristic delay value is provided to a signal producing unit 55, also called a feedback unit or a filter unit, that from the received value produces a signal suitable for controlling the clock generator 45. The unit 55 may e.g. be a loop filter of as typically included in a PLL (Phase Locked Loop).

Figure 8B:
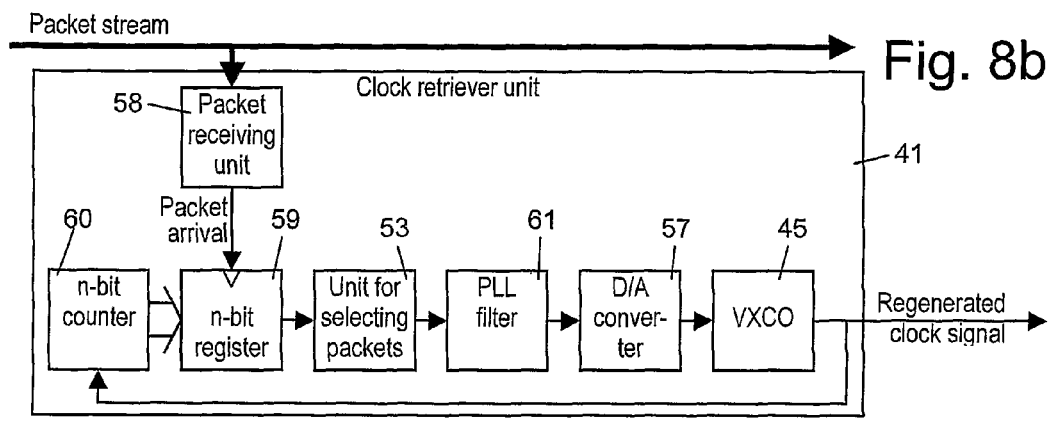
FIG. 8b is a block diagram of an embodiment of the clock retriever unit of FIG. 7.

A general clock unit 52 based on such a phase locked loop may include main components as illustrated in the block diagram of FIG. 8b. The clock generator 45 is here a VCXO (Voltage controlled crystal oscillator) 45 and it receives its control signal from a D/A converter (DAC) 57. The fact that a packet has been determined to have been arrived, as is determined in a unit 58, produces a signal directly controlling an n-bit register 59. When the n-bit register receives such a control signal indicating that a new packet has just arrived, the full content of an n-bit counter 60 is copied to the n-bit register. Then the n-bit register 59 transfers its current content to a unit 53 for selecting packets. The transferred values are evaluated in the packet selecting unit and only the selected values are provided to a PLL loop filter 61 that is a low-pass filter and generates a filtered value input to the D/A converter 57. The regenerated clock signal obtained from the VCXO 45 is fed back to the n-bit counter 60 connected to the n-bit register 59. The n-bit counter increments its value for each clock pulse generated, e.g. for each leading edge. The number of bits in the n-bit counter 60 is selected, considering the frequency of pulses generated by the VCXO, so that it wraps around every packet period.

For a distribution of delay values such as that of FIG. 4 having a steep slope and a lot of packets arriving with delays close to a minimum delay, $min_x$, an algorithm based on the arrival times of those received packets which have the smallest delay values within a time window for the arrival times of received packets can be used for determining the characteristic delay value.

For a distribution of delay values such as that of FIG. 5a, that can be obtained for e.g. a transport network having a high load, the majority of packets are delayed significantly more than the minimum delay. Then, the method of using packets having delays equal to or very close to the minimum delay is not efficient for determining a characteristic delay value. If e.g. a method using the average of the 20% lowest values in some window is used to find an estimate of the frequency or period with which the packets are issued can be derived, this estimate is probably better than that determined using the first discussed method and hence such a method is probably also more efficient.

Such a method involves the two steps:

Find, among the packets within the window, e.g. within the N packets which have most recently arrived or within a time window, i.e. the packets which have arrived within the time period of length T from the current time, where N is a fixed number and T is a fixed time length, the packets of interest, e.g. the p·N packets that have the smallest delays, where p is the considered share, e.g. equal to 20%.

Calculate the average of the delays of the found packets or find some equivalent quantity, value or signal, such as by a low-pass filtering operation, suitable for controlling the clock generator 45.

Figure 9:
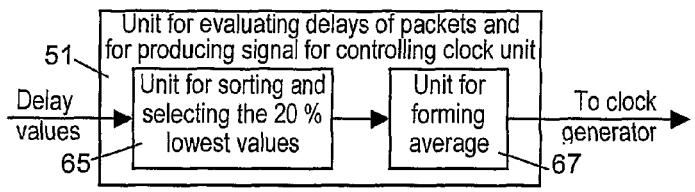
FIG. 9 is a block diagram of units for producing a characteristic delay value.

However, there is a problem to implement the first of these steps using an acceptable, not too high, number of calculations. To find the packets that have the lowest delay values within e.g. a time-window normally requires a sorting procedure, see the block diagram of FIG. 9. In this figure two units are illustrated, that could be included in the evaluation and signal producing unit 51, a sorting and selection unit 65, that may be considered to correspond to the evaluating unit 53, for performing the operations necessary to select the 20% lowest delay values and an average calculation unit 67 for determining the average of the selected delay values or some equivalent quantity as described above. The sorting operation is a complex procedure that in turn requires a lot of operations, in particular a multitude of comparisons.

Figure 10:
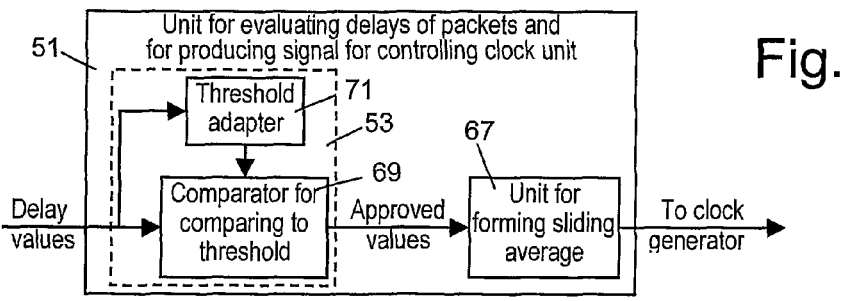
FIG. 10 is a block diagram of units required to produce a characteristic delay value in another embodiment.

Other methods can be used, e.g. the method illustrated in the block diagram of FIG. 10, in which the delay values are compared to a variable threshold delay value corresponding to the 20% limit. Values in the window that fall under the threshold $T_p$ are used in the average calculation. The threshold delay value should be adaptive, constantly and automatically adapting to the 20% limit, this implying that the number of packets having delay values smaller than the threshold $T_p$ may not be exactly equal to the selected share, e.g. 20%, of the packets within the window. The value 20% is only an example and higher and lower values can be used, if desired or suitable, as will be discussed hereinafter. In FIG. 10 units that may be necessary for performing this method are illustrated and that may be included in the evaluation and signal producing unit 51. A comparing unit 69 compares the determined delay of each received packet to the threshold $T_p$ and provides the delay value only if higher than the threshold to an averaging unit 67 for determining the average of only the selected delay values within a sliding window. A threshold adaptation unit 71 is arranged to adapt the threshold $T_p$ used in the comparing operation of the comparing unit and may for the adapting operation use the result of the comparing or directly the delays of received packets.

In the operation of adapting the threshold $T_p$ the numbers of packets having delay values larger and smaller than the threshold are counted. The threshold value is adjusted in such a way that the numbers of packets having values over and under the threshold correspond to the preferred percentage of e.g. 20%. This may be done by adjusting the threshold $T_p$ according to the following algorithm where x is the delay value of a received packet in relation to the clock signal currently generated by the clock retriever unit 41:

For each received packet having a delay value under or equal to the threshold, the threshold $T_p$ is decreased.

For each received packet having a delay value over the threshold, the threshold $T_p$ is increased.

If the increase of the threshold $T_p$ is proportional to the desired probability for an approved value p, i.e. p=0.2 for 20% in the example, and the reduction of the threshold is equal to (1−p), i.e. equal to 0.8 in the example, the algorithm will adapt the threshold to the correct value. A small number μ, e.g. equal to 0.01, determines the adaptation speed. The procedure can be described by the following pseudocode segment, see also FIG. 11:

```
DO for all received values x
    IF x < threshold
        threshold = threshold − μ·(1−p)
        use x in the average calculation
    ELSE
        threshold = threshold + μ·p
        do not use x in the average calculation
    END
END
```

Figure 11:
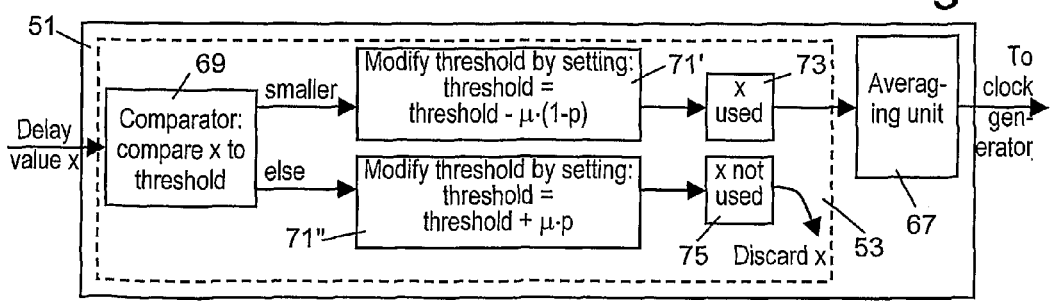
FIG. 11 is a block diagram of units required to produce a characteristic delay similar to the units of FIG. 10.

The procedure may be performed by the units illustrated in the block diagram of FIG. 11, these units e.g. included in the evaluation and signal producing unit 51 and in particular in the evaluating unit/packet selecting unit 53. Due to the result of the comparison in the comparing unit 69, one of two parallel adaptation units 71' and 71" makes a modification of the threshold value $T_p$, according to the respective formula above. In the same way, one of two units 73, 75 sets the use of the delay value in the averaging operation performed by the averaging/filtering unit 67.

The functions of the two adaptation units 71' and 71" may be performed by a single adaptation unit 77. An example of the internal structure of such a single adaptation unit appears from the diagram of FIG. 12. Here the comparing unit 69 is a comparator e.g. outputting a signal having the value 0 or 1 depending on the result of the comparing operation. This signal is used to control a switch 79 connected to fixed signals representing the values p and (p−1), respectively, one of these signals thus provided to a multiplying circuit or amplifying circuit 81, amplifying the selected signal by a factor representing the quantity μ defining the adaptation speed, and providing the amplified signal to a summing or integrating unit 83 including a hold circuit 85 and an adder 87, the adder also receiving as input a value representing the current threshold value held by the hold circuit. From the output of the summing unit that is the same as the output of the hold circuit, the signal representing the current threshold value is provided to the comparator 69.

Figure 12:
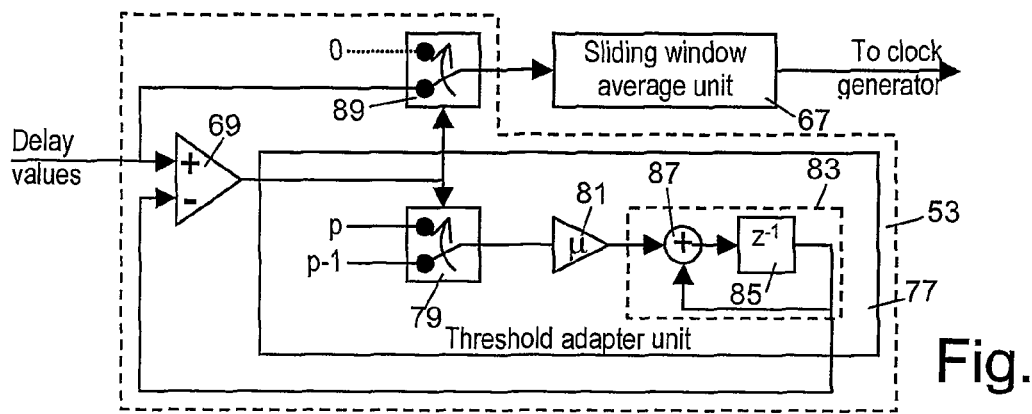
FIG. 12 is a circuit diagram of units required to produce a characteristic delay value according the block diagram of FIG. 11, FIGS. 13a-13d are graphs illustrating delay distributions and their mean and median values.

In the case where the x value is not to be used because it is above the threshold $T_p$, preferably zero can be inserted of this delay value. An alternative is to only input the delay values x that are lower than or equal to the threshold $T_p$, i.e. not to insert zeroes. In the latter case the average can be taken over a certain number of approved values rather than a certain time window or window of received packets. As illustrated in the diagram of FIG. 12, this can be achieved by having the output signal of the comparator 69 control a second switch 89 that provides either the signal representing the delay of the most recently received packet to the averaging unit 67 or a signal representing zero to that unit.

The value of the threshold $T_p$ is only used for finding the delays from which the desired average is determined. However, this value also contains information on the shape of the distribution of the delays. Hence, for instance the threshold value $T_p$ for p=50% is the median of the delay distribution.

Information on the shape of the current distribution can be used for controlling the value of the parameter p actually used for the averaging operation and hence for controlling the frequency of the clock signal generated by the clock generator 45. For e.g. the different delays distributions illustrated in FIGS. 4, 5a and 5b different suitable p-values can be used and these distributions can be distinguished from each by characteristic values that can be easily calculated.

The graphs of FIGS. 13a-13d show typical delay distributions. The mean value is indicated by a vertical line and the median value by an asterisk. Depending on the mean and median values different percent values of p can be chosen.

Figure 13B:
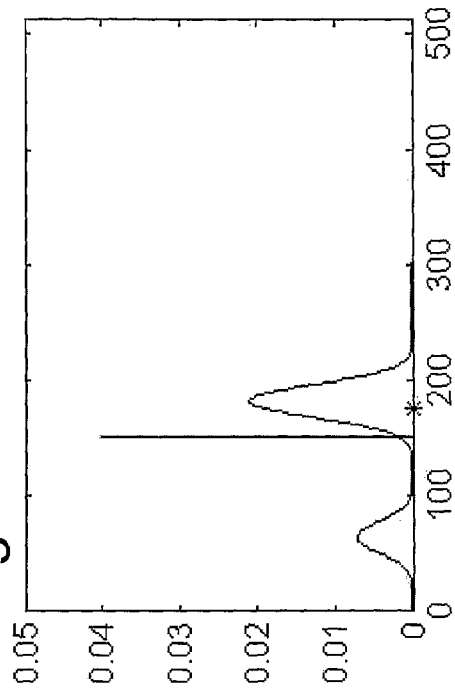
Figure 13D:
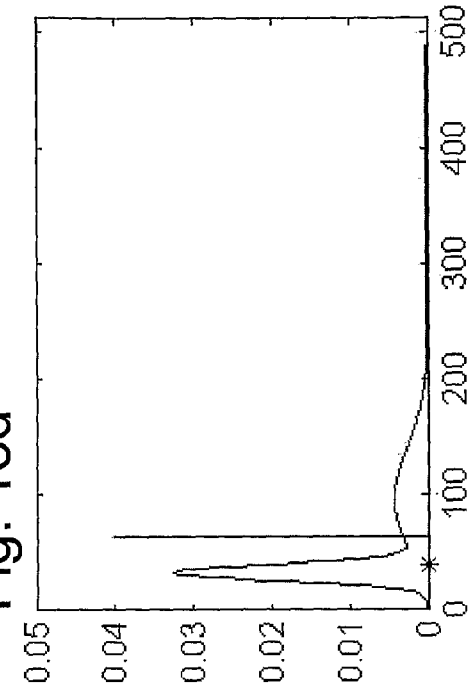
Figure 13A:
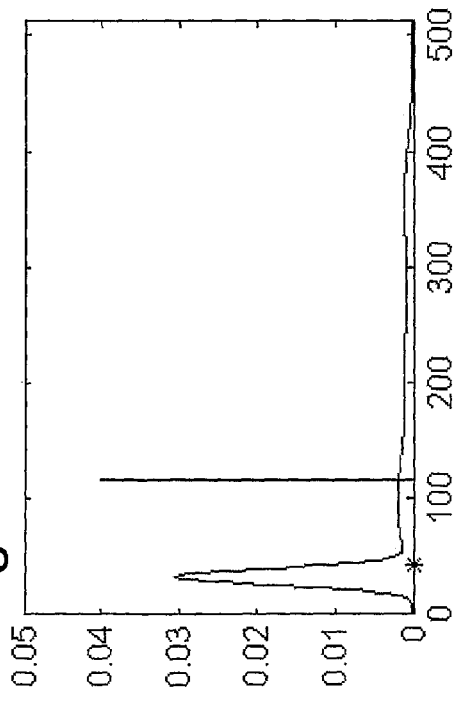

1. FIG. 13a illustrates a distribution having a very long and substantial trail extending up to high delays. The median value is much smaller than the mean value. The value of p can suitably be selected to e.g. 60%.

2. FIG. 13b illustrates a distribution having a pronounced double peak structure. The median value is larger than the mean value. The value of p can suitably be selected to e.g. 30%.

Figure 13C:
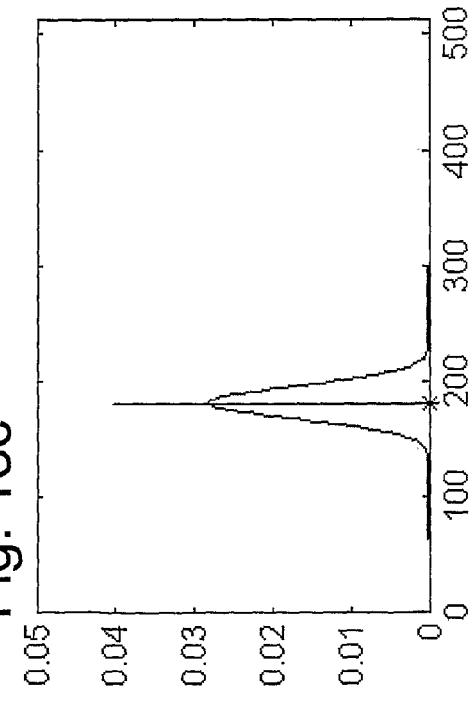

3. FIG. 13c illustrates a symmetric delay distribution having a single peak. The median value is substantially equal to the mean value. The value of p can suitably be selected to e.g. 100%.

4. FIG. 13c illustrates a delay distribution having a high peak at a low delay values and a moderately large trail extending to not too high values. The median value is somewhat smaller than the mean value. The value of p can suitably be selected to e.g. 60%.

Figure 14:
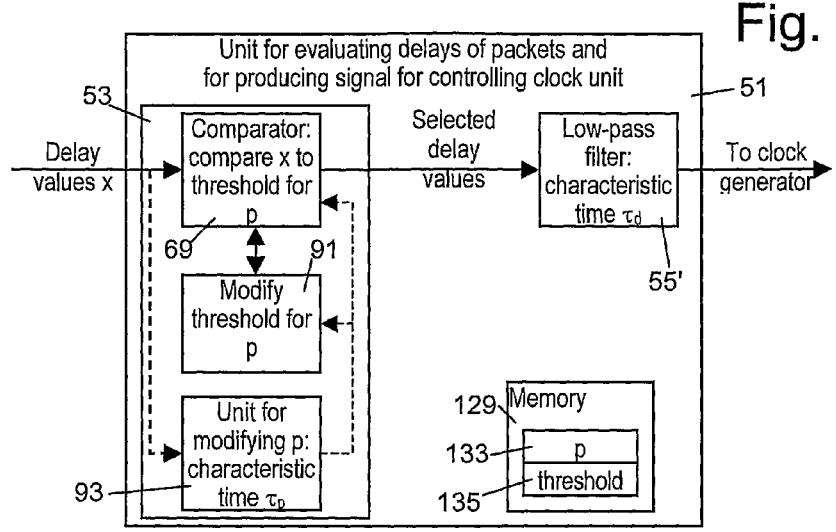
FIG. 14 is a block diagram of a unit for evaluating and producing a control signal.

In order to provide a modifiable p-value, the unit 51 for evaluating delays of packets and producing a signal for controlling the clock generator 45 has to be supplemented with some components. As seen in the block diagram of FIG. 14, the unit 51 then may as above contain the evaluating unit 53 that in turn includes the comparator 69 for comparing delays of received packets to the current value $T_p$ of the adaptive threshold for the share given by the parameter p. The value of the parameter p is for each received packet modified by a modifying unit 91 also included in the evaluating unit 53 that in addition includes a unit 93 for modifying the value of the parameter p. The unit 93 can e.g. examine the delays for received packets and make some choice based on the result of the examination to find a modified value of the parameter p. The change of the parameter p should be made rather slowly, significantly slower than changing the signal output from low-pass filter 55', corresponding to the signal producing unit/filtering unit 55 of FIG. 8a. Thus, the characteristic time $\tau_p$ for changing the value of the parameter p should be long compared to the characteristic time $\tau_d$ for changing the control signal provided to the clock generator.

Figure 15:
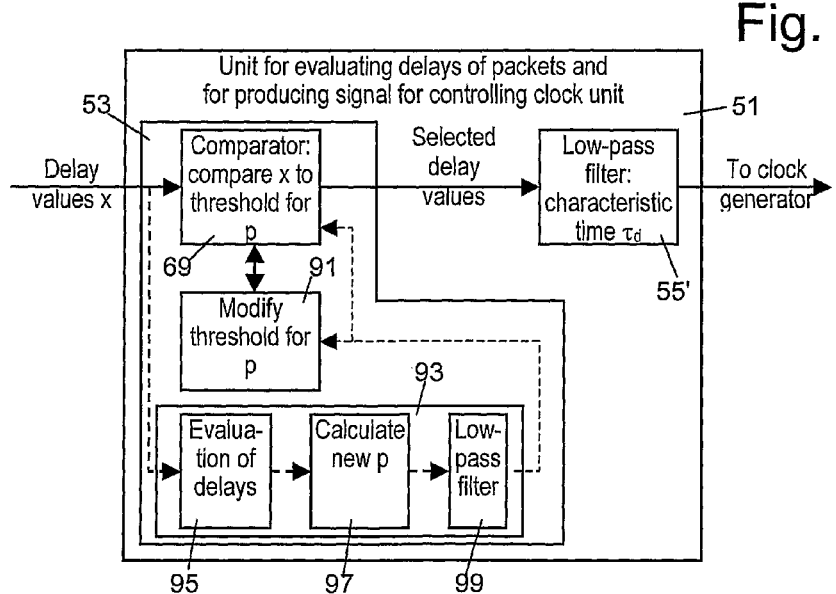
FIG. 15 is a block diagram similar to FIG. 14 in which an evaluating unit includes a delay evaluation unit.
Figure 16A:
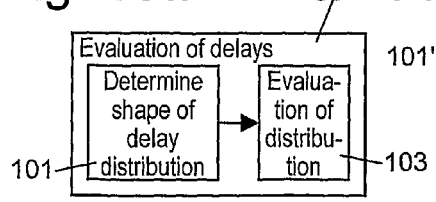
FIGS. 16a and 16b are block diagrams of two embodiments of a delay evaluation unit.
Figure 16B:
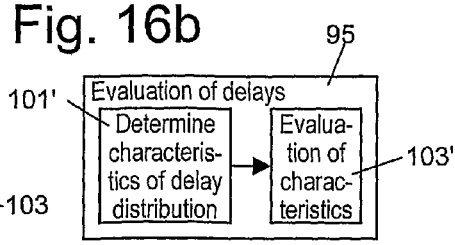

The modifying unit 93 may as seen in FIG. 15 include a unit 95 for evaluation of the delays, a unit 97 for calculation of a new value of the parameter p and a unit 99 for delaying the change of this value, the unit 99 for example being a low-pass filter. The evaluation unit 95 can be arranged to in some way determine the shape of the distribution of the delays of the latest received packets. Such determining can be made in a unit 101 outputting the result of the determining to a unit 103 for evaluating the determined distribution, see FIG. 16a. More particularly, as seen in FIG. 16b, first some characteristics of the distribution of the latest determined delays can be determined in a unit 101' and then these determined characteristics evaluated in a unit 103'. This evaluation unit 103' can e.g. be arranged to make the evaluation according to a suitable algorithm or by a table look-up, the algorithm or table determined by e.g. simulating packet traffic.

Figure 17:
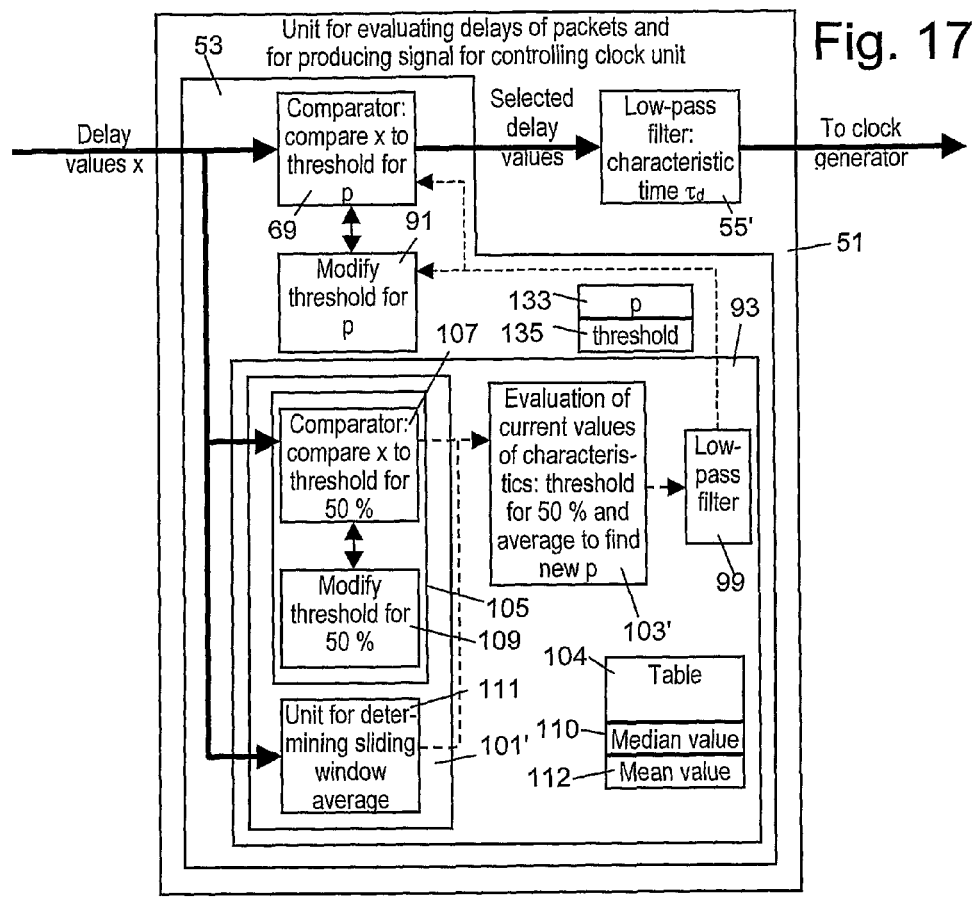
FIG. 17 is a block diagram similar to FIG. 14 of a unit in which a delay evaluation unit includes units for determining characteristics of the distribution of delays.

Then, the characteristics determining unit 101' may include a unit 105 for determining the median, see FIG. 17. The median determining unit is built from a comparator 107 connected to receive determined delays and constructed similar to the comparator 69 but set for a constant value 50%. It is connected to a threshold modifying unit 109 that is also included in the median determining unit and is similar to the threshold modifying unit 91. The determined threshold value may be stored, if necessary, in a memory cell 110. Furthermore, the characteristics determining unit 101' can include a unit 111 for determining the average of the delays of the latest received packets. The average determining unit may, if required store the determined average value, also called mean value, in a memory cell 112. The average determining 111 unit can be designed, as has above been discussed for averaging units 55, 55' and 67, as a low-pass filter and it provides the determined average to the evaluation unit 103', that also receives the determined median value from the modifying unit 109. The evaluation unit may use a table stored in a memory place 104 to find, for each combination av median and mean values, a suitable p-value.

In order to increase the speed of the threshold adaptation performed in the units 71', 71"; 91 and 109 a variable step algorithm can be used. The principle idea is that if the threshold $T_p$ is very far from its optimum value, either too high or to low, the delay values will mainly be below or above the threshold. An algorithm may be based on the principle that if adjacent values are of the same character, i.e. both above or both below the threshold, the speed of adaptation is increased by increasing the value of the adaptation speed parameter μ. If adjacent values are not of the same character, i.e. one above and one below the threshold, the speed of adaptation is decreased.

If the threshold $T_p$ is placed at e.g. 10%, i.e. p=0.1, hence at 10% of the values below the threshold, then it is more likely to get several values above the threshold. To compensate for this, the step is increased less if the values are above the threshold $T_p$ than if the values are above the threshold. The procedure can be described by the following pseudocode segment:

```
DO for all received values x
    IF x < threshold
        IF last_value = 'below'
            μ = μ·(1 + (1 − p)·0.005)
        ELSE
            μ = μ/(1 + (1 − p) ·0.005)
        END
        last value = 'below'
        ...
    ELSE
        IF last_value = 'above'
            μ = μ·(1 + p·0.005)
        ELSE
            μ = μ/(1 + p·0.005)
        END
        last value = 'above'
    END
END
```

The lines including a division operation can be replaced with $$\mu=\mu\cdot(1-(1-p)\cdot 0.005)$$

$$\mu=\mu\cdot(1-p\cdot 0.005)$$

Figure 18:
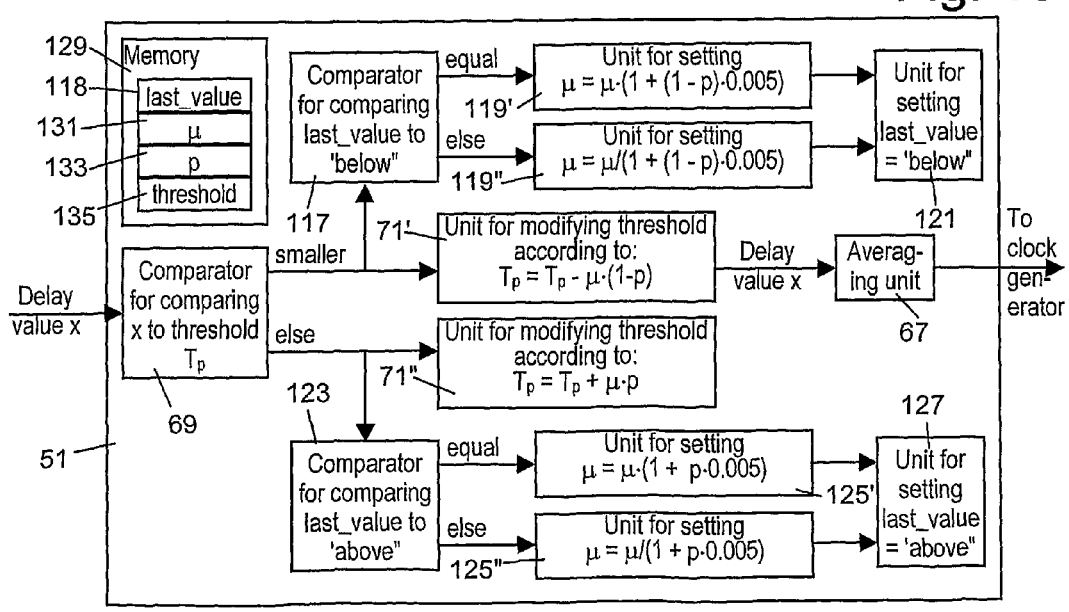
FIG. 18 is a block diagram similar to FIG. 11 including units for modifying an adaptation speed parameter.

The value 0.005 is here generally some small, suitably selected number that characterizes the speed with which the adaptation speed of the threshold changes. The algorithm can be easily performed in a unit included in the evaluating unit 53 and working in parallel with the units 69, 71' and 71" of FIG. 11 and the units 69, 91 and 93 of FIGS. 14, 15 and 17. Hence, as seen in FIG. 18, determined values x of the delays of received packets are as above in the comparator 69 compared to the current value of the threshold $T_p$. If a delay value is smaller than the threshold, it is determined in a unit 117 whether the value called "last value" stored in a memory cell 118 is equal to the character string 'below'. If it is true the value of threshold speed adaptation parameter μ is modified in a unit 119'. Otherwise it is modified in a parallel unit 119". Finally, the value called "last value" is in a unit 121 set to the character string 'below' and stored in the memory cell 118. If it is determined in the comparator 69 that the value x is not smaller than the threshold, it is similarly tested in a unit 123 whether the stored value called "last value" is equal to the character string 'above'. If it is true, the parameter μ is modified in a unit 125' and else in a parallel unit 125" In the latter two cases, the value called "last value" is in a unit 127 set to the character string 'above' and stored in the memory cell 118. The evaluating unit 53 generally includes or is connected to a memory 129 in which the memory cell 118 can be a part and which may include memory cells 131, 133, 135 for storing the current value of the parameter μ, the current value of the share parameter p and the current value of the threshold Tp.

The unit 67 for calculating a sliding window average may, as has been described above, be designed as a low-pass filter, e.g. incorporated in or constituting the signal producing/filtering unit 55. The feedback loop of such a filter should generally have a much larger time constant than the changes of the adaptation threshold $T_p$, i.e. the delay before sending a signal to change the generated frequency is much longer than the time periods elapsed before a changed adaptation threshold is determined.

Figure 19:
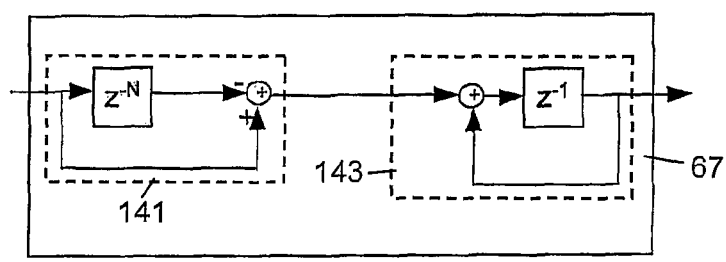
FIG. 19 is a diagram of a simple circuit for producing a characteristic delay value.

Alternatively, the operation of calculating a sliding window average can be implemented as a separate unit that e.g. as seen in FIG. 19, in a simple case, consists of a delay unit 141, delaying the provision of delay values by N steps, and an integrator 143 including a hold circuit connected in series.

While specific embodiments of the invention have been illustrated and described herein, it is realized that numerous other embodiments may be envisaged and that numerous additional advantages, modifications and changes will readily occur to those skilled in the art without departing from the spirit and scope of the invention. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention. Numerous other embodiments may be envisaged without departing from the spirit and scope of the invention.

The invention claimed is:

1. A receiving unit receiving packets including a device for producing, from received packets, a clock signal, the device including:
a clock signal generator for generating a clock signal having a controllable frequency,
a delay determining unit determining the delays of received packets in relation to the clock signal, the delays of most recently received packets forming a delay distribution ranging from a current minimum delay value to larger delay values, and
an evaluating and control signal producing unit for evaluating delays and for producing a control signal provided to the clock signal generator based on the delays, the evaluating and control signal producing unit including:
means for determining a characteristic delay value, which is characteristic of the delay distribution and for producing the control signal from the characteristic delay value, wherein the characteristic delay value is determined as an average of all of the time delays of the distribution less than a variable threshold value obtained for a predetermined share of received packets; and
an evaluating unit including:
a memory or memory cell for holding a variable threshold value,
a comparing unit for comparing the determined delay of a received packet to the threshold value,
an adaptation unit connected to the comparing unit for adiustinq the threshold value dependent on a result of the comparing, and
an averaging unit or low pass filter connected to the comparing unit for determining an average or filtered value of delays of selected ones of received packets, the selecting being dependent on the result of the comparing,
wherein the variable threshold value defines the number of time measurement values to be utilized by the averaging unit or low pass filter to determine the average or filtered value of the delays.

2. The receiving unit according to claim 1, wherein the evaluating unit includes:
a memory or memory cell for holding a variable adaptation speed value, wherein the adaptation unit also adjusts the threshold value dependent on the adaptation speed value.

3. A method of producing a clock signal in a receiving unit receiving packets, said method comprising the steps of:
generating a clock signal having a controllable frequency,
determining delays of received packets in relation to the clock signal, the delays of most recently received packets forming a delay distribution ranging from a current minimum delay value to larger delay values, and
evaluating delays and producing a control signal for controlling the frequency of the clock signal based on the determined delays, by forming a characteristic delay value, which is characteristic of the delay distribution and producing the control signal from the formed characteristic delay value,
wherein in forming the characteristic delay value, the characteristic delay value is formed as an average of all of the smallest delays of the delay distribution for a predetermined share of received packets, and
wherein in forming the average, the following steps are executed:
determining, for each received packet, the delay of the packet,
comparing the determined delay of each received packet to a variable threshold value,
adjusting the variable threshold value dependent on the result of the comparing,
selecting determined delays dependent on the result of the comparing, and determining an average of the selected determined delays or a filtered value from the selected determined delays.

4. The method according to claim 3, wherein the step of adjusting the variable threshold value includes adjusting the variable threshold value dependent on a variable adaptation speed value.

5. A method of issuing information from a receiving unit receiving packets, said method comprising the steps of:

generating a clock signal having a controllable frequency, determining delays of received packets in relation to the clock signal, the delays of most recently received packets forming a delay distribution ranging from a current minimum delay value to larger delay values, evaluating delays and producing a control signal for controlling the frequency of the clock signal based on the determined delays, by forming a characteristic delay value characteristic of the delay distribution and producing the control signal from the formed characteristic delay value, and issuing information from the receiving unit based on the generated clock signal, wherein the characteristic delay value is formed as a quantity or signal substantially equivalent to an average of all of the smallest delays of the delay distribution for a predetermined share of received packets, and wherein in forming the quantity or signal substantially equivalent to said average the following steps are executed:

determining, for each received packet, the delay of the packet, comparing the determined delay of each received packet to a variable threshold value, adjusting the variable threshold value dependent on the result of the comparing, selecting determined delays dependent on the result of the comparing, and determining an average of the selected determined delays or a filtered value from the selected determined delays.

6. The method according to claim 5, wherein the step of adjusting the variable threshold value includes adjusting the variable threshold value dependent on a variable adaptation speed value.

* * * * *

UNITED STATES PATENT AND TRADEMARK OFFICE
CERTIFICATE OF CORRECTION

PATENT NO. : 7,830,922 B2  
APPLICATION NO. : 12/093372  
DATED : November 9, 2010  
INVENTOR(S) : Andre It is certified that error appears in the above-identified patent and that said Letters Patent is hereby corrected as shown below:

In Column 9, Line 19, delete "125'"" and insert -- 125". --, therefor.

In Column 10, Line 23, in Claim 1, delete "adiustinq" and insert -- adjusting --, therefor.

Signed and Sealed this

Seventeenth Day of May, 2011

David J. Kappos  
*Director of the United States Patent and Trademark Office*